United States Patent
Jacob et al.

(10) Patent No.: US 8,316,715 B2
(45) Date of Patent: Nov. 27, 2012

(54) VIBRATION SENSOR

(75) Inventors: Joern Jacob, Kirnbach (DE); Holger Gruhler, Tuningen (DE); Josef Fehrenbach, Haslach (DE); Martin Mellert, Steinach (DE); Frank Becherer, Haslach (DE)

(73) Assignee: Vega Grieshaber KG, Wolfach (DE)

( * ) Notice: Subject to any disclaimer, the term of this patent is extended or adjusted under 35 U.S.C. 154(b) by 505 days.

(21) Appl. No.: 12/628,755

(22) Filed: Dec. 1, 2009

(65) Prior Publication Data

US 2010/0175476 A1 Jul. 15, 2010

Related U.S. Application Data

(60) Provisional application No. 61/148,700, filed on Jan. 30, 2009.

(30) Foreign Application Priority Data

Jan. 15, 2009 (EP) .................................... 09000479

(51) Int. Cl.
*G01N 29/24* (2006.01)
*G01M 7/02* (2006.01)

(52) U.S. Cl. ........................................... 73/643; 73/662

(58) Field of Classification Search .................... 73/643, 73/662
See application file for complete search history.

(56) References Cited

U.S. PATENT DOCUMENTS

| | | | |
|---|---|---|---|
| 3,974,499 A | | 8/1976 | Shigemori et al. |
| 4,069,805 A | * | 1/1978 | Sherman ............ 125/30.02 |
| 4,222,455 A | * | 9/1980 | Lerwill ................ 181/121 |
| 4,314,202 A | * | 2/1982 | Okubo ............ 324/207.15 |
| 4,717,906 A | | 1/1988 | Smith |
| 2008/0055013 A1 | | 3/2008 | Alvarez |

FOREIGN PATENT DOCUMENTS

| | | |
|---|---|---|
| DE | 4404020 A1 | 1/1995 |
| DE | 10 2006 016 355 A1 | 10/2007 |
| EP | 497568 | 8/1992 |
| FR | 667264 | 5/1929 |
| WO | WO 87 0489 | 7/1987 |
| WO | WO 96/04645 | 2/1996 |

OTHER PUBLICATIONS

EPO Searcch Report issued Jun. 19, 2009 for Appln. Serial No. EP 09 000479.7 filed Jan. 15, 2009, 7 pages in German, plus 4 pages partial translation, paras. 3.1-4.
Appln. Serial No. CN 200910252311.6, Office Action mailed Mar. 28, 2012, 8 pages—English, 6 pages—Chinese.

* cited by examiner

*Primary Examiner* — Peter Macchiarolo
*Assistant Examiner* — Rose M Miller
(74) *Attorney, Agent, or Firm* — Andrew F. Young, Esq.; Lackenbach Siegel, LLP

(57) ABSTRACT

The invention is a vibration sensor with a carrying element capable of being set into vibration; a conversion device having a field coil to set and/or tap the carrying element into vibration; an anchor mounted in the field coil; and, a vibration element to transmit the vibrations from the carrying element into/from a surrounding space. The anchor is designed as two parts, having a permanent magnet and a coil core connected to the field coil, with an air gap arranged therebetween and lying in the area of the axial extension of the field coil. The permanent magnet is connected to the carrying element to transmit vibrations; and, the field coil and the permanent magnet are arranged to interact in such a way that any vibration of the permanent magnet induces current flow in the field coil and/or induces vibration of the permanent magnet in the field coil.

23 Claims, 3 Drawing Sheets

VIBRATION SENSOR

CROSS REFERENCE TO RELATED APPLICATIONS

This application claims priority from EPO Application Ser. No. 09 000479.7 filed Jan. 15, 2009 and from U.S. Provisional Patent Application Ser. No. 61/148,700, filed Jan. 30, 2009, the contents of each of which are fully incorporated herein by reference.

BACKGROUND OF THE INVENTION

1. Field of the Invention

The present invention relates to a vibration sensor. More specifically, the present invention relates to a vibration sensor with a carrying element capable of being set into vibration and a conversion device to set the carrier element into vibration as discussed herein.

2. Description of the Related Art

The related art involves a vibration sensor as taught and described in DE 10 2006 016 355 A1 in which the conversion device has a field coil and an anchor as a coil core. The anchor is directly connected to a carrier element designed as a membrane for the transmission of the vibrations, with the field coil and the anchor interacting in such a way that any vibration of the anchor will induce a current flow in the winding core and/or a current flow inducing a magnet field will effect a vibration of the anchor in the winding core. The anchor is made of magnetizable material or designed as a permanent magnet.

What is not appreciated by the prior art is that this known vibration sensor is provided with a conversion device which, for the use as an inductive drive unit, generates only a low magnetic force, because, among other reasons, its structure leads to stray fields within and outside of the vibration sensor.

Accordingly, there is a need for an improved vibration sensor with a conversion device that avoids the aforementioned disadvantages and that is particularly suitable for use at high temperatures.

ASPECTS AND SUMMARY OF THE INVENTION

One aspect of the present invention is to provide an improved vibration sensor with a conversion device that avoids the aforementioned disadvantages and that is particularly suitable for use at high temperatures.

The present invention relates to a vibration sensor with a carrying element capable of being set into vibration; a conversion device having a field coil to set the carrying element into vibration and/or to tap a vibration of the carrying element; an anchor mounted in the field coil; a vibration element and/or a carrying element designed as a vibration element to transmit the vibrations from the carrying element into a surrounding space and/or from a surrounding space to the carrying element.

In accordance with the invention, the anchor is designed as two parts, having a permanent magnet and a coil core connected to the field coil, with an air gap arranged between the permanent magnet and the coil core lying in the area of the axial extension of the field coil; moreover, the permanent magnet is connected to the carrying element for the transmission of the vibrations and the field coil and the permanent magnet are arranged to interact in such a way that any vibration of the permanent magnet induces vibration and/or a current flow inducing a magnetic field effecting a vibration of the permanent magnet in the field coil.

According to a further embodiment of the present invention there is provided a vibration sensor comprising a carrying element capable of being set into vibration. There is also provided a conversion device having a field coil to set the carrying element into a first set of vibrations and/or to tap a second set of vibrations of the carrying element. Additionally, the sensor comprises an anchor mounted in the field coil and a vibration element to transmit the first vibrations from the carrying element into a surrounding space and/or from the surrounding space to the carrying element.

The latter is characterized by the anchor being constructed in two pieces, the two pieces comprising a permanent magnet and a coil core connected to the field coil. There is an air gap arranged between the permanent magnet and the coil core lying in an area defined by of an axial extension of the field coil. The coil core is connected to the carrying element for the transmission of the first set or the second set of vibrations. The field coil and the permanent magnet are arranged to interact in such a way that a vibration of the coil core will induce a current flow in the coil and/or that a current flow inducing a magnetic field will effect a vibration of the coil core in the field coil.

Summarized in an alternatively and comparable manner, the proposed vibration sensor has a conversion device in which the anchor is designed in two pieces consisting of a permanent magnet with a coil core and an air gap arranged between them in such a way that the air gap lies in the area of the axial extension of the field coil.

In a first proposed solution for the transmission of the vibrations to a vibration element, the permanent magnet is connected to the carrying element, with the field coil connected to the coil core and the permanent magnet being arranged to interact in such a way that a vibration of the permanent magnet will induce a current flow in the field coil and/or a current flow inducing a magnet field effecting a vibration of the permanent magnet in the field coil.

In a second proposed solution, the coil core connected to the field coil for the transmission of the vibrations is connected to the carrying element, with the field coil connected to the coil core being arranged to interact in such a way that a vibration of the coil core will induce a current flow in the field coil and/or a current flow inducing a magnet field will effect a vibration of the coil core in the field coil.

The arrangement of a permanent magnet, so to speak as part of the coil core, yields a great drive force in the conversion device as compared to an arrangement with a conventional coil core. This is achieved by the fact that this permanent magnet causes an offset as compared with an arrangement with a conventional coil core with a field force H so that the B-H course ends up in the area of the larger increase, resulting in a larger B as well as a larger BE (with a $\Delta I$) with the consequence that due to $F \sim B^2$, $\Delta F$, i.e. the drive force F, increases accordingly as well.

The bipartite design of the conversion device must be particularly emphasized as well, according to which the field coil, on the one hand, together with the coil core forms one unit and, on the other hand, the permanent magnet also forms a unit so that, on the one hand, the vibrations between the permanent magnet and the carrying element are transmittable with a fixed field coil or, on the other hand, the vibrations between the coil core and the carrying element are transmittable with a fixed permanent magnet.

In a further development of the invention, a coil receptacle enclosing the field coil is provided to generate a magnetic yoke of the field coil which leads to a beneficial reduction of the stray fields inside and outside of the vibration sensor and consequently to an increase in the drive force. In this case, the field coil is firmly attached in this coil receptacle to the effect that either the permanent magnet vibrates vis-à-vis this fixed coil receptacle or the coil receptacle with the coil core vibrates vis-à-vis the fixed permanent magnet.

This coil receptacle is preferably shaped like a pot with a pot bottom, with the coil core being centrally mounted in a centric borehole of the pot bottom. This achieves a compact design made up of field coil, coil receptacle and coil core, simultaneously assuring an excellent yoke not only in the area of the cylindrical exterior surface of the field coil but also at the front end of the field coil turned away towards the permanent magnet. Since the magnetic flux lines always follow the course of least resistance, it is naturally advantageous to make the coil receptacle of magnetizable material.

In a particularly preferred further development of the invention, for the purpose of creating a closed magnet circuit between the free end of the permanent magnet lying opposite the coil core and the coil receptacle, a magnet receptacle is provided for such free end on the permanent magnet. This offers an optimal course of low resistance to the external magnetic flux lines on the side of the permanent magnet laying opposite the coil core as well whereby, together with the coil receptacle, the magnetic stray fields can be minimized.

This further development also results in a bipartite design of the magnetic circuit of the conversion device which, on the one hand, is formed by the coil receptacle with the field coil and the coil core and, on the other hand, by the magnet receptacle with the permanent magnet.

The magnet receptacle preferably has a cylindrical basic shape corresponding to the coil receptacle so that the air gap created between the coil receptacle and the magnet receptacle can be optimized with respect to the drive force.

In this regard, a particularly simple design of this magnet receptacle will result if, in accordance with another further development of the invention, this magnet receptacle is equipped with an axial cylindrical recess to accommodate the free end of the permanent magnet.

For a lowering of the magnetic resistance of this magnet receptacle, it is proposed to use a magnetizable material for its manufacture.

In accordance with a further development of the invention, an optimized position of the permanent magnet is an arrangement in which the air gap between the permanent magnet and the coil core is centric with regard to the axial extension of the field coil, i.e. the permanent magnet lies with its pole faces centrically in the field coil. Tests have shown that this is an optimal position with regard to a high drive force.

In a further development of the invention, the carrying element is designed as a bottom plate, preferably as a membrane of a pot-shaped housing accommodating the coil receptacle and the magnet receptacle, with either the coil receptacle or the magnet receptacle being firmly attached to the housing, depending on the model.

In order to prevent the creation of stray fields in spite of the optimized external magnetic circuit, in a further development of the invention, the housing and the carrying element, in particular the membrane, including the vibration element are made of a non-magnetizable material.

In order to make the vibration sensor suitable for high temperatures, the vibration element and/or the carrying element, in particular the membrane, are made of a heat-treated material in order to reduce any detrimental or material distortion at high temperatures. This reduces the thermal hysteresis significantly. The heat treatment may be done in the form of solution heat treatment or stress relief heat treatment.

The above, and other aspects, features and advantages of the present invention will become apparent from the following description read in conduction with the accompanying drawings, in which like reference numerals designate the same elements.

DETAILED DESCRIPTION OF THE PREFERRED EMBODIMENTS

Figure 1:
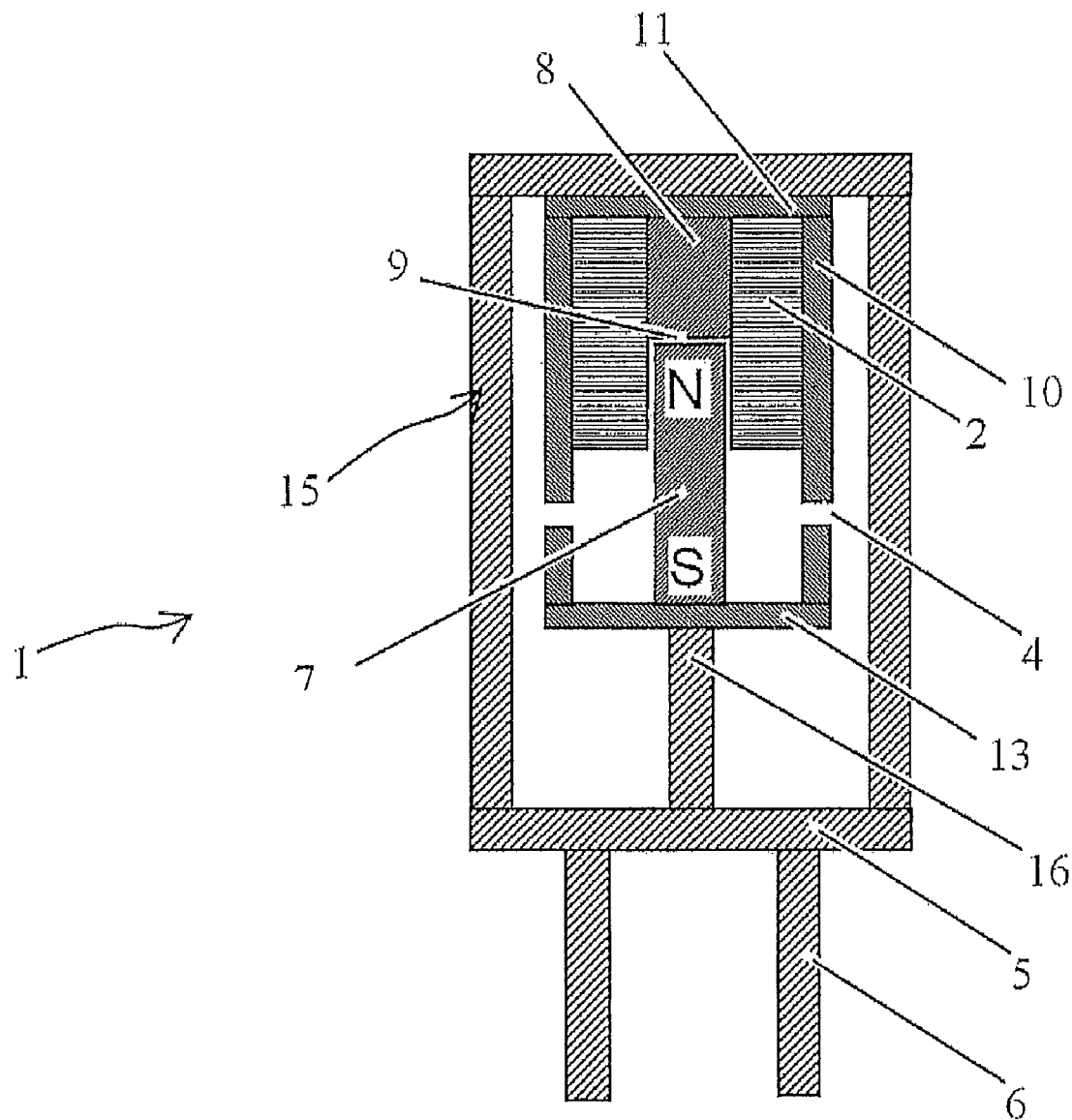
FIG. 1 is a schematic representation of the basic principle of a vibration sensor in accordance with the invention in an initial embodiment.

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, up, down, over, above, and below may be used with respect to the drawings. These and similar directional terms should not be construed to limit the scope of the invention in any manner. The words "connect," "couple," and similar terms with their inflectional morphemes do not necessarily denote direct and immediate connections, but also include connections through mediate elements or devices.

First, the basic principle of a vibration sensor in accordance with the invention or, respectively, its construction in accordance with the invention, will be explained by way of FIGS. 1 and 2.

Figure 2:
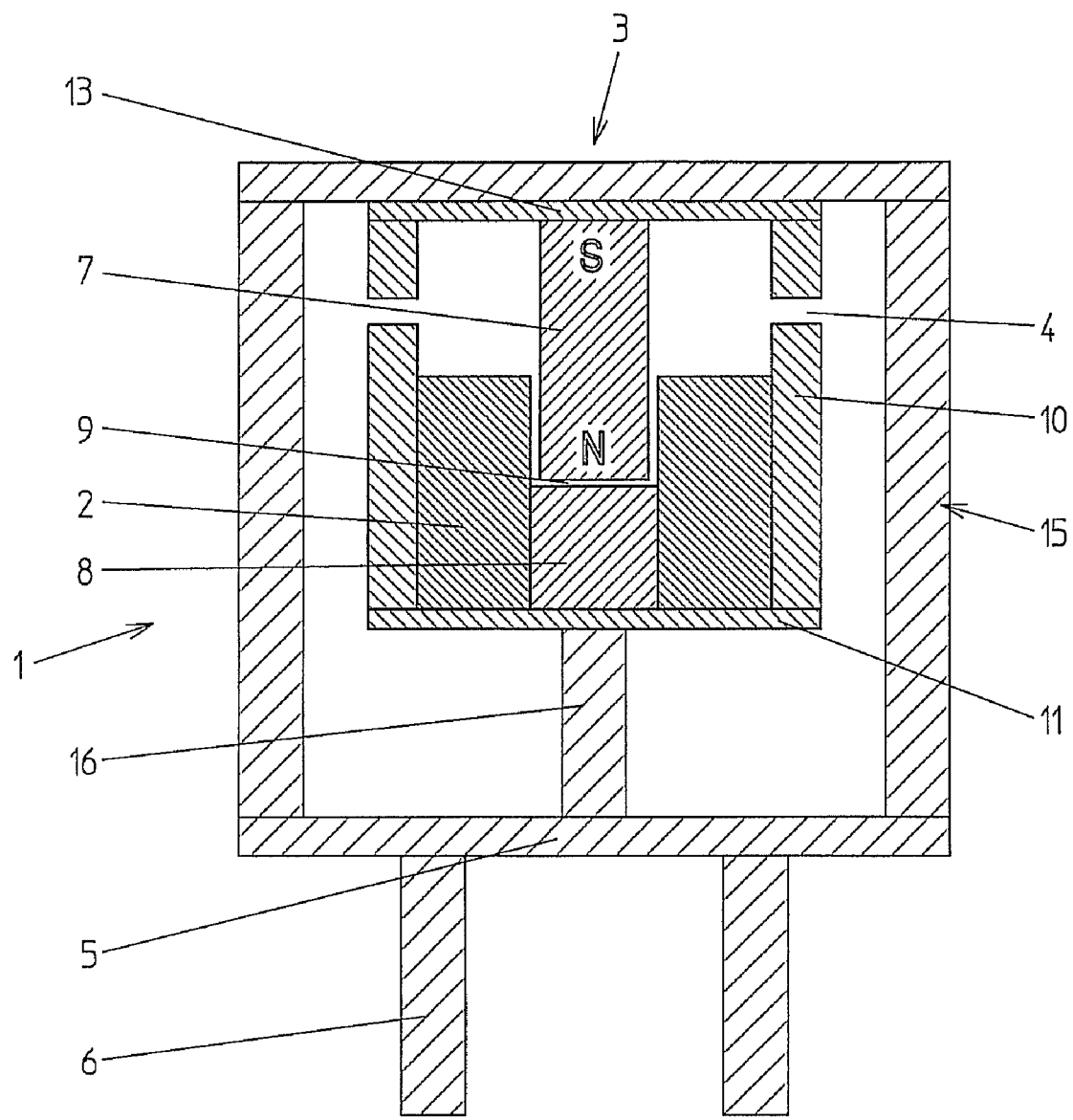
FIG. 2 is a schematic representation of the basic principle of a vibration sensor in accordance with the invention in a second embodiment.

In FIGS. 1 and 2, the reference numbers 3 or, respectively, 15, each designate a conversion device 3 or, respectively, 15, of a vibration sensor 1 in accordance with the invention, with the two conversion devices 3 having the same design.

Such a conversion device 3 comprises a field coil 2 with a pot-shaped coil receptacle 10 forming a magnetic yoke, with a coil core 8 being encased by the field coil 2 starting from the pot bottom 11 of said coil receptacle 10. In its length, the coil core 8, starting from its end lying on the pot bottom 11 of the coil receptacle 10, extends to approximately the center of the field coil 2. Forming an air gap 9, a permanent magnet 7 adjoins this which extends beyond the front end of the field coil 2 lying opposite the pot bottom 11 of the coil receptacle 10 where it is connected with its free end to a magnet receptacle 13 forming an additional magnetic yoke. The magnet receptacle 13 is designed in such a way that its external diameter is adapted to the external diameter of the coil receptacle 10, thereby making it possible for an air gap 4 to form between the coil receptacle 10 and the magnet receptacle 13. If the field coil 2 is fed a current, this will create a closed magnet circuit whose magnetic field lines running in the permanent magnet 7 and in the coil core 7 within the field coil 2 will close outside of the field coil 2 via the coil receptacle 10 and the magnet receptacle.

The housing shown by its outlines in FIG. 1 and in FIG. 2 comprises a carrying element 5 designed as a membrane as well as a vibration element 6 consisting of vibration forks that is held in place by it. Moreover, a connecting element 16 provides a connection between the carrying element 5 and the conversion device 3 for the transmission of the vibrations to the carrying element 5 and the vibration fork 6.

In FIG. 1, the coil receptacle 10 forms one unit together with the field coil 2 and the coil core 8; the permanent magnet 7 together with the magnet receptacle 13 is vibratable against this unit, with the connecting element 16 being connected to the magnet receptacle 13 for the transmission of the vibrations either from the magnet receptacle 13 to the carrying element 5 or, respectively, to the vibration element 6 or in the opposite direction from the vibration element 6 or, respectively, from the carrying element 5 to the magnet receptacle 13.

If an alternating current is fed to the field coil 2, it will effect a vibration of the permanent magnet 7, with the latter moving axially back and forth similar to a pestle that is nearly halfway encased by the field coil 2. This vibration is then transmitted to the carrying element 5 and the vibration fork via the connecting element 16.

Conversely, a vibration of the carrying element 5 or, respectively, of the vibration fork 6 is transmitted to the permanent magnet 7 which will induce a corresponding current flow in the filed coil due to the axial back and forth movement.

The vibration sensor as per FIG. 2 differs from that of FIG. 1 in that the conversion device 3 is rotated by 180° relative to the housing so that now the connecting element 16 is firmly connected with the coil receptacle 10.

Since the permanent magnet 7 together with the magnet receptacle 13 is now mounted stationary, in the event of an alternating current feed to the field coil 2, a vibration of the coil receptacle 10 forming one unit with the field coil 2 and the coil core 8 will be caused, with this unit moving axially back and forth against the permanent magnet. Due to the fixed connection of the coil receptacle 10 with the carrying element 5 or, respectively, with the vibration forks 6 by means of the connecting element 16, this vibration will be transmitted to the carrying element 5 or, respectively, to the vibration forks 6.

In this embodiment, too, it is possible to transmit vibrations of the carrying element 5 or, respectively, of the vibration forks 6 to the unit made up of the coil receptacle 10 and the coil core, with a current being induced in the field coil 2 due to the relative movement between the field coil 2 and the permanent magnet 7.

Figures 3, 4:
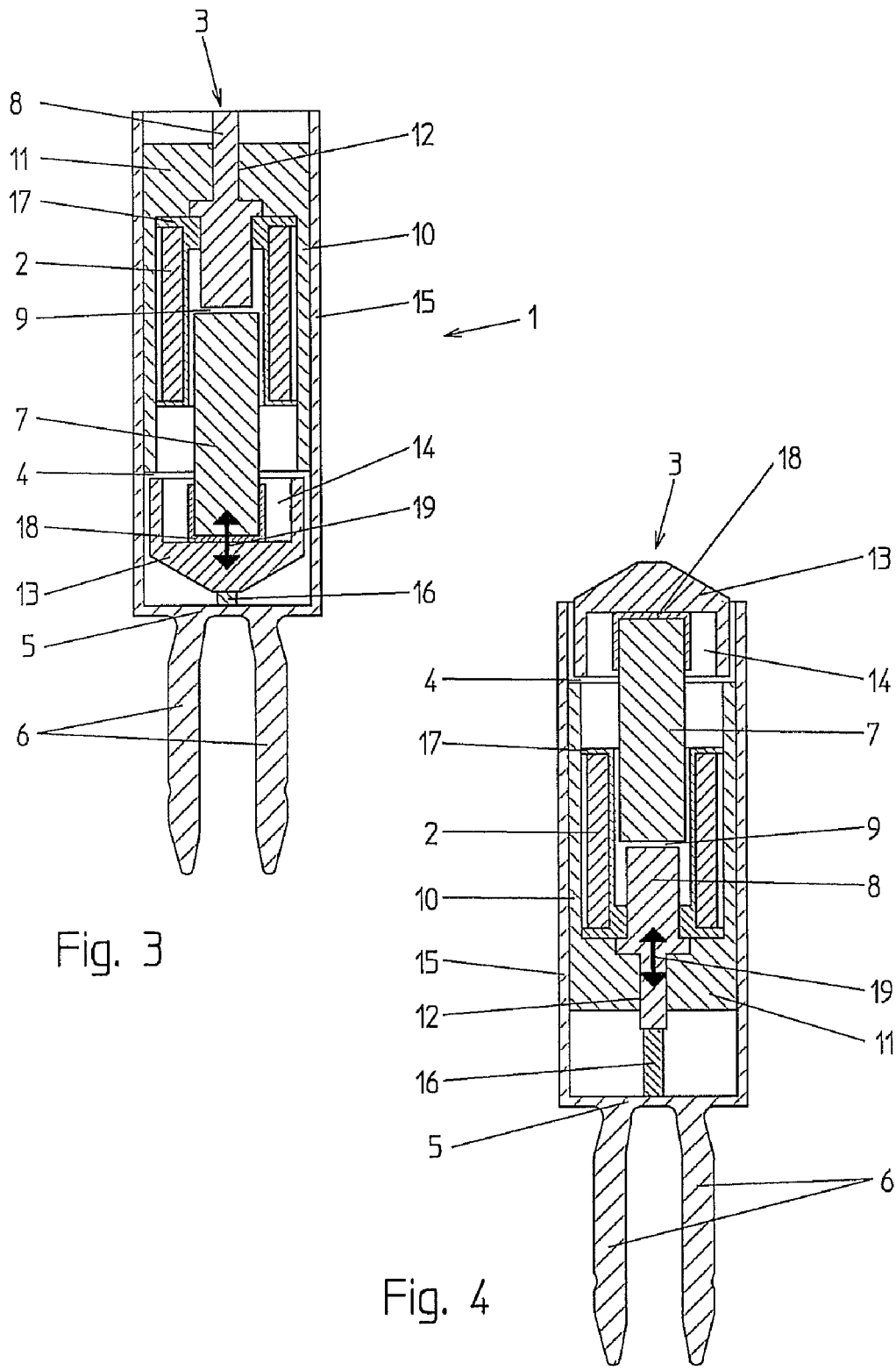
FIG. 3 is a representation in a longitudinal cut of a vibration sensor in accordance with the invention in an embodiment according to FIG. 1.
FIG. 4 is a representation in a longitudinal cut of an additional embodiment of a vibration sensor in accordance with the invention in an execution according to FIG. 2.

Turning to FIGS. 3 and 4 there is shown the mechanical structure of such vibration sensors 1, with the vibration sensor 1 according to FIG. 3 or, respectively, FIG. 4 corresponding in principle to the structure according to FIG. 1 or, respectively, FIG. 2.

According to FIG. 3, as well as to FIG. 4, a conversion device 3 is arranged in a preferably cylindrical housing 15 that is closed off at it frontal end by a carrying element 5 designed as a membrane or bottom plate. The membrane 5 is designed to be vibratable with regard to dimensioning, attachment and/or material. Preferably, but not necessarily, vibration forks 6 protrude from the membrane 5 that transmit a vibration of the membrane to a space surrounding the vibration forks 6. In addition or alternatively, a transmission of vibrations from the direction of the space via the vibration forks 6 to the membrane 5 is possible as well in order to vibrate the membrane 5 accordingly.

If the vibration forks 6 are dispensed with, the membrane 5 is designed in such a way that any vibrations of the membrane 5 can be transmitted by the latter directly to the surrounding space or, respectively, can be received from the surrounding space.

As is shown in FIG. 3, the conversion device 3 arranged in the interior space of the housing 15 consists of a pot-shaped coil receptacle 15 that accommodates in its hollow-cylindrical interior space a field coil 2 coiled around a coil body 17. The coil receptacle 10 is arranged in the housing 15 in such a way that its frontal end closed off by a pot bottom 11 closes off the frontal end of the housing 15 lying opposite the membrane 5. This coil receptacle 10 is firmly attached to the internal surface of the housing via its external circumferential surface.

The field coil 2 is fixated in the coil receptacle 10 via its external circumferential surface and the interior surface of the coil receptacle and abuts with its one frontal end the coil receptacle 10 directly adjacent to the pot bottom 11. The coil receptacle 10 has a central borehole 12 in its pot bottom 11 in which a coil core 8 is mounted that extends axially approximately to the middle of the field coil 2. The coil core 8 preferably designed with a circular shaped cross section has a greater cross section in the area of the field coil 2 than in the area of the pot bottom 11 of the coil receptacle. In the transition area of the two diameters there is a collar-shaped stopper that lies in a ring-shaped groove of the pot bottom. The part of the coil core 8 extending from this stopper is fixated in the coil receptacle 10 and extends beyond the pot bottom 11 all the way to the frontal end of the housing 15.

In its axial extension, the field coil 2 does not extend to the frontal end of the coil receptacle 10 adjacent to the membrane 6.

A magnet receptacle 13 connected to the membrane 5 via a connecting element 16 is arranged between this frontal end of the coil receptacle 10 and the membrane 5 that serves to accommodate a permanent magnet 7. This magnet receptacle 13 is also shaped like a pot with a cylindrical recess 14 in which a sleeve 18 abutting the bottom surface of this cylindrical recess 14 accommodates and simultaneously fixates the permanent magnet 7.

This magnet receptacle 13, together with the permanent magnet 7, is mounted movably in the direction of the arrow by means of a magnet field generated by the field coil 2 in the housing 15, with a small gap being provided between the exterior circumferential surface of the magnet receptacle 13 and the interior circumferential surface of the housing.

The axial extension of the magnet receptacle 13 and of the permanent magnet 7 is coordinated in such a way that, with no current being fed, a first air gap 9 between the opposite pole faces of the permanent magnet 7 and of the coil core 8 and a second air gap 4 between the frontal ends of the coil receptacle 10 and the magnet receptacle 13 will be created. To this end, the exterior diameter of the magnet receptacle 13 is specially adapted to the exterior diameter of the coil receptacle 10.

When an alternating current is being fed to the field coil 2 as the drive unit, a magnet field is building up whose field lines are almost completely guided in a closed magnet circuit that, within the field coil 2, consists of the permanent magnet 7 and the coil core 8 and that closes again in the exterior space via the pot bottom 11 of the coil receptacle 10, its cylindrical walls enclosing the field coil 2 and via the second air gap 4 via the cylindrical walls of the magnet receptacle 13 and its bottom. In order to keep the magnetic resistance in this magnet circuit as low as possible, the coil core 8, the coil receptacle 10 as well as the magnet receptacle 13 are made of magnetizable, in particular ferromagnetic material.

Due to this current feed to the field coil 2, the unit consisting of the magnet receptacle 13 and the permanent magnet 7 are put into axial vibrations as indicated by the arrow 19. These vibrations are transmitted to the membrane 5 and the vibration forks 6 via the connecting element 16.

By means of the closed magnet circuit, a great attractive force is achieved in the area of the pole faces of the permanent magnet 7 and of the coil core 8 lying opposite each other in the field coil and forming the first air gap as well as on the front ends forming the second air gap 4, with this effect being supported by the few magnetic stray fields since the magnetic field lines will take the course of least resistance which is provided by the closed magnet circuit. The use of a permanent magnet with high magnetic resonance contributes thereto as well.

The adaptation of the cross sections of the cross section surfaces participating in the first and second air gaps 9 and 4 leads to a constant field line density in the closed magnet circuit with an additional increase of the magnetic force in the area of these air gaps 9 and 4 as a consequence.

An additional minimization of the stray fields results from the use of non-magnetizable materials for the housing 15 and the connection element 16.

Moreover, the structure in accordance with the invention makes it possible to adjust the first and second air gaps 9 and 4 to a minimal air gap width; preferably, this width lies at approximately 0.5 mm.

Conversely, the vibration sensor 1 may also be operated in such a way that vibrations are transmitted from the external space to the unit consisting of the magnet receptacle 13 and the permanent magnet 7 via the vibration forks 6 or the membrane 5 that will induce a corresponding current in the field coil 2.

The vibration sensor 1 according to FIG. 4 corresponds in its basic principle to the representation according to FIG. 2 and shows a structure that differs from that of FIG. 3 in that the conversion device described in connection with FIG. 3 is built into a housing 15 in a position that is rotated by 180°. In the following, only the differences will be dealt with and in connection with the description of FIG. 4, a conversion device that has already been described will be assumed.

In the case of the vibration sensor 1, in accordance with FIG. 4, the magnet receptacle 13, as well as the permanent magnet fixated in this magnet receptacle 13, is located at the front end of the housing 15 lying opposite the membrane 2, with the housing 15 being closed by the external bottom surface of the magnet receptacle 13. Moreover, the magnet receptacle 13 is firmly connected to the interior circumferential surface of the housing 15 via its external circumferential surface.

The coil receptacle 10 is arranged movably in the housing 15 in an axial direction opposite the unit consisting of magnet receptacle 13 and permanent magnet 7 fixated in the housing 15 so that according to the arrow 19, when the field coil 2 is fed an alternating current, the coil receptacle 10 as well as the field coil 2 including the coil core 8 firmly attached to it will carry out a vibration that is transmitted to the membrane 5 and to the vibration forks 6 via a connection element 16 connected to the coil core 8.

To this end the coil receptacle 10, with regard to its external diameter, is designed in such a way that a gap permitting an axial movement of the coil receptacle 10 is formed between the circumferential surface of the coil receptacle 10 and the internal circumferential surface of the housing 15.

The advantages described in conjunction with the vibration sensor 1 according to FIG. 3 as well as the advantageous design with regard to the use of suitable materials also apply to the vibration sensor in accordance with FIG. 4.

This concerns in particular the great magnetic attraction force in the area of the air gaps 4 and 9 due to the closed magnet circuit as well as the use of magnetizable, especially ferromagnetic materials for the coil receptacle 10 forming this magnet circuit, including the coil core 8 and the magnet receptacle 13. Likewise, the air gaps 4 and 9 can be minimized for the purpose of increasing the force and, in addition, the cross sectional surfaces forming part of these air gaps 4 and 9 can be adapted. Finally, non-magnetizable materials are being used for the housing 15 and the connection element 16 as well.

In lieu of being used as a drive unit, the vibration sensor 1 in accordance with FIG. 4 may also be used in such a way that vibrations are transmitted from the external space to the unit consisting of the coil receptacle 10, the field coil 2 and the coil core 8 via the vibration forks 6 or the membrane 5 that will induce a corresponding current in the field coil 2.

In order to make the vibration sensor 1, in accordance with FIG. 3 as well as with FIG. 4, usable at high temperatures, the membrane 5 as well as the vibration forks 6 are subjected to heat treatment in order to minimize the thermal hysteresis with regard to any material distortion. This may be done by means of solution annealing or stress annealing.

In order to obtain high frequency stability across a large range of temperatures, the temperature of the field coil 2 may, for example, be measured by means of resistance measurements or by a thermo-element, thereby realizing a compensation of any temperature fluctuations.

In the claims, means or step-plus-function clauses are intended to cover the structures described or suggested herein as performing the recited function and not only structural equivalents but also equivalent structures. Thus, for example, although a nail, a screw, and a bolt may not be structural equivalents in that a nail relies on friction between a wooden part and a cylindrical surface, a screw's helical surface positively engages the wooden part, and a bolt's head and nut compress opposite sides of a wooden part, in the environment of fastening wooden parts, a nail, a screw, and a bolt may be readily understood by those skilled in the art as equivalent structures.

Having described at least one of the preferred embodiments of the present invention with reference to the accompanying drawings, it is to be understood that the invention is not limited to those precise embodiments, and that various changes, modifications, and adaptations may be effected therein by one skilled in the art without departing from the scope or spirit of the invention as defined in the appended claims.

What is claimed is:

1. A vibration sensor comprising:
    (a) a carrying element capable of being set into vibration;
    (b) a conversion device having a field coil to set said carrying element into vibration and/or to tap a vibration of said carrying element;
    (c) an anchor mounted in said field coil;
    (d) a vibration element to transmit said vibration from said carrying element into a surrounding space and/or from said surrounding space to said carrying element; and, characterized by:
        (i) said anchor being constructed in two pieces, said two pieces comprising a permanent magnet and a coil core connected to said field coil;

(ii) an air gap arranged between said permanent magnet and said coil core lying in the area of the axial extension of said field coil;

(iii) said permanent magnet being connected to said carrying element for the transmission of said vibration; and (iv) said field coil and said permanent magnet being arranged to interact in such a way that said vibration of said permanent magnet will induce a current flow in said field coil and/or that a current flow inducing a magnet field will effect a vibration of the permanent magnet in said field coil.

2. A vibration sensor in accordance with claim 1, comprising a coil receptacle, enveloping said field coil, for the generation of a magnetic yoke of said field coil.

3. A vibration sensor in accordance with claim 2, wherein said coil receptacle is shaped like a pot with a pot bottom, and said coil core being mounted in a centric borehole of said pot bottom.

4. A vibration sensor in accordance with claim 2, wherein said coil receptacle is made of a magnetizable material.

5. A vibration sensor in accordance with claim 2, wherein said carrying element is connected to said coil receptacle via a connection element.

6. A vibration sensor in accordance with claim 2, wherein said carrying element is connected to a magnet receptacle via a connection element.

7. A vibration sensor comprising:

(a) a carrying element capable of being set into vibration;

(b) a conversion device having a field coil to set said carrying element into a first set of vibration and/or to tap a second set of vibrations of said carrying element;

(c) an anchor mounted in said field coil;

(d) a vibration element to transmit said first vibrations from said carrying element into a surrounding space and/or from a surrounding space to said carrying element, characterized by:

(i) said anchor being constructed in two pieces, said two pieces comprising a permanent magnet and a coil core connected to said field coil;

(ii) an air gap arranged between said permanent magnet and said coil core lying in an area defined by an axial extension of said field coil;

(iii) said coil core being connected to said carrying element for the transmission of said first set or said second set of vibrations; and (iv) said field coil and said permanent magnet being arranged to interact in such a way that a vibration of said coil core will induce a current flow in said field coil and/or that a current flow inducing a magnet field will effect a vibration of said coil core in said field coil.

8. A vibration sensor in accordance with claim 7, wherein said carrying element is made of non-magnetizable material.

9. A vibration sensor in accordance with claim 7, wherein said vibration element is made of non-magnetizable material.

10. A vibration sensor in accordance with claim 7, wherein a coil receptacle enveloping said field coil is provided so as to generate a magnetic yoke of the field coil.

11. A vibration sensor in accordance with claim 7, wherein in order to reduce any material distortion at high temperatures, said vibration element is made of a heat-treated material.

12. A vibration sensor in accordance with claim 7, wherein in order to reduce any material distortion at high temperatures, said carrying element is made of a heat-treated material.

13. A vibration sensor in accordance with claim 10, wherein said carrying element is connected to said coil receptacle via a connection element.

14. A vibration sensor in accordance with claim 10, wherein said carrying element is connected to a magnet receptacle via a connection element.

15. A vibration sensor in accordance with claim 10, wherein said coil receptacle is made of a magnetizable material.

16. A vibration sensor in accordance with claim 10, wherein a magnet receptacle is provided for a free end of said permanent magnet for creation of a closed magnet circuit between the free end of said permanent magnet opposite said coil core and said coil receptacle.

17. A vibration sensor in accordance with claim 16, wherein said magnet receptacle has a basic cylindrical shape corresponding to said coil receptacle.

18. A vibration sensor in accordance with claim 16, wherein said magnet receptacle has an axial cylindrical recess to accommodate said free end of said permanent magnet.

19. A vibration sensor in accordance with claim 16, wherein said magnet receptacle is made of a magnetizable material.

20. A vibration sensor in accordance with claim 16, wherein said air gap between said permanent magnet and said coil core is arranged centrically with respect to the axial extension of said field coil.

21. A vibration sensor in accordance with claim 16, wherein said carrying element is designed as a bottom plate of a pot-shaped housing accommodating said coil receptacle and said magnet receptacle.

22. A vibration sensor in accordance with claim 21, wherein said pot-shaped housing is made of non-magnetizable material.

23. A vibration sensor in accordance with claim 21, wherein said bottom plate is designed as a membrane.

* * * * *